(12) United States Patent
Konishi et al.

(10) Patent No.: US 10,788,805 B2
(45) Date of Patent: Sep. 29, 2020

(54) NUMERICAL CONTROLLER HAVING TOOL PATH INTERPOLATION

(71) Applicant: FANUC CORPORATION, Minamitsuru-gun, Yamanashi (JP)

(72) Inventors: Kouki Konishi, Yamanashi (JP); Hiroyuki Kawamura, Yamanashi (JP); Osamu Hanaoka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/149,396

(22) Filed: Oct. 2, 2018

(65) Prior Publication Data
US 2019/0101888 A1 Apr. 4, 2019

(30) Foreign Application Priority Data
Oct. 3, 2017 (JP) .................................. 2017-193401

(51) Int. Cl.
*G05B 19/19* (2006.01)
*G05B 19/4103* (2006.01)

(52) U.S. Cl.
CPC ......... *G05B 19/19* (2013.01); *G05B 19/4103* (2013.01); *G05B 2219/34083* (2013.01); *G05B 2219/34135* (2013.01); *G05B 2219/35261* (2013.01); *G05B 2219/45044* (2013.01)

(58) Field of Classification Search
CPC ............ G05B 2219/34083; G05B 2219/35261
USPC ........................................................ 700/187
See application file for complete search history.

(56) References Cited

U.S. PATENT DOCUMENTS

| | | | | |
|---|---|---|---|---|
| 2007/0046677 A1* | 3/2007 | Hong | ...................... | G05B 19/41 345/442 |
| 2008/0033699 A1* | 2/2008 | Hioki | ................................. | 703/1 |
| 2012/0215334 A1 | 8/2012 | Tanuma et al. | | |
| 2019/0137975 A1* | 5/2019 | Nishiwaki | .............. | G05B 19/41 |

FOREIGN PATENT DOCUMENTS

| | | | |
|---|---|---|---|
| JP | 58195208 A | 11/1983 | |
| JP | 05165514 A | 7/1993 | |
| JP | 0675621 A | 3/1994 | |
| JP | 08249036 A | 9/1996 | |
| JP | 2000-353006 A | 12/2000 | |
| JP | 2001117617 A | 4/2001 | |
| JP | 2011-96077 A | 5/2011 | |

OTHER PUBLICATIONS

Japanese Decision to Grant a Patent for Japanese Application No. 2017-193401, dated Nov. 5, 2019, with translation, 5 pages.

* cited by examiner

*Primary Examiner* — Emilio J Saavedra
(74) *Attorney, Agent, or Firm* — RatnerPrestia

(57) ABSTRACT

A numerical controller that creates a tool path from a plurality of command points includes: a command point sequence acquisition unit that acquires an existing command point sequence; a command point creating unit that creates at least one additional command point, based on the existing command point sequence; and an interpolation processing unit that interpolates the existing command point sequence and the additional command point to create the tool path. The command point creating unit outputs, as the additional command point, an intersection point Q1 between an arc C1 passing through consecutive three command points, P0, P1 and P2, in the existing command point sequence and a perpendicular bisector of a line segment whose end points are P1 and P2.

3 Claims, 4 Drawing Sheets

NUMERICAL CONTROLLER HAVING TOOL PATH INTERPOLATION

CROSS-REFERENCE TO RELATED APPLICATION

This application is a new U.S. Patent Application that claims benefit of Japanese Patent Application No. 2017-193401, filed Oct. 3, 2017, the disclosure of this application is being incorporated herein by reference in its entirety for all purposes.

BACKGROUND OF THE INVENTION

1. Field of the Invention

The present invention relates to a numerical controller and, in particular, to a numerical controller capable of improving the quality of a machining surface of a workpiece by correctly interpolating command points.

2. Description of the Related Art

In a case of creating a program for machining a mold or the like, CAM (computer aided manufacturing) converts a curve (hereinafter, an ideal curve; see the left diagram in FIG. 1) created by CAD (computer aided design) into a point sequence. These points are called command points (see the center diagram in FIG. 1). The ideal curve is converted into the command point sequence to thereby be represented as infinitesimal line segments, and information on between the command points are lost. CNC (computerized numerical control) smooths these infinitesimal line segments output from CAM, thereby creating a tool path made up of a smooth curve (see the right diagram in FIG. 1).

In this case, as shown in the left diagram in FIG. 2, if the densities of command points generated by CAM are aligned between adjacent paths (i.e., point sequences adjacent to each other), the differences in height (hereinafter, steps) between the adjacent paths across the processing surface direction are small. Consequently, as shown in the right diagram in FIG. 2, steps are unlikely to occur also on the smoothed tool paths. On the contrary, as shown in the left diagram in FIG. 3, if the densities of command points generated by CAM are uneven between the adjacent paths, the steps between the adjacent paths are large. As shown in the right diagram in FIG. 3, the steps on the smoothed tool paths are also large accordingly. In FIG. 3, the tool paths with disordered steps between the adjacent paths are represented by broken lines. The disordered steps on the tool paths reduce the quality of the machined workpiece surface. Consequently, for example, in high-accuracy mold processing, the variation in steps between adjacent paths is required to be reduced to be several micron meters or less.

There are many conventional smoothing functions of outputting a spline curve based on a command point sequence. Use of the spline curve can achieve a smooth output as one path. However, as shown in FIG. 4, the spline curve does not necessarily include the point sequence on which the spline curve is based (i.e., does not include the points). Consequently, the spline curve does not accurately restore the ideal curve. For example, if the command point densities are different between the adjacent paths, the shape of the curve to be restored is also different accordingly. As a result, a disorder of steps between adjacent paths sometimes occurs.

Techniques to address such a problem include Japanese Patent Application Laid-Open Nos. 2011-096077 and 2000-353006. Japanese Patent Application Laid-Open Nos. 2011-096077 and 2000-353006 each disclose a technique of inserting a new command point in order to adjust the steps with respect to the adjacent tool paths in a numerical controller for generating tool paths on the basis of multiple command points.

Unfortunately, the methods of Japanese Patent Application Laid-Open Nos. 2011-096077 and 2000-353006 require adjusting the tool path with reference to the adjacent paths. The processes are complicated.

Meanwhile, another method may sometimes be adopted that does not use the smoothing function and reduces CAM tolerance and increases the number of command points in order to avoid the problem of the smoothing function as described above. There is, however, a problem in that since the method requires a high processing capability, CNC capable of a high-speed processing is required.

SUMMARY OF THE INVENTION

The present invention has been made to solve such a problem, and has an object to provide a numerical controller capable of improving the quality of a machining surface of a workpiece by accurately interpolating command points without reference to adjacent paths.

A numerical controller according to one embodiment of the present invention is a numerical controller creating a tool path from a plurality of command points, including: a command point sequence acquisition unit that acquires an existing command point sequence; a command point creating unit that creates at least one additional command point, based on the existing command point sequence; and an interpolation processing unit that interpolates the existing command point sequence and the additional command point to create the tool path, wherein the command point creating unit outputs, as the additional command point, an intersection point Q1 between an arc C1 passing through consecutive three command points, P0, P1 and P2, in the existing command point sequence and a perpendicular bisector of a line segment P1P2.

In the numerical controller according to one embodiment of the present invention, the command point creating unit outputs a midpoint between the intersection point Q1 and an intersection point Q2 as the additional command point, the intersection point Q2 being between an arc C2 passing through P1, P2 and P3 that is adjacent to P2 in the existing command point sequence and the perpendicular bisector of the line segment P1P2.

In the numerical controller according to one embodiment of the present invention, the command point creating unit creates the additional command point at a position between command points in the existing command point sequence only when the distance between said command points is larger than a predetermined value.

The present invention can provide a numerical controller capable of improving the quality of a machining surface of a workpiece by accurately interpolating command points without reference to adjacent paths.

BRIEF DESCRIPTION OF THE DRAWINGS

The aforementioned and other objects and characteristics of the present invention will be apparent according to the description of the following examples with reference to the accompanying drawings. Among the diagrams.

DETAILED DESCRIPTION OF THE PREFERRED EMBODIMENTS

Figure 1:
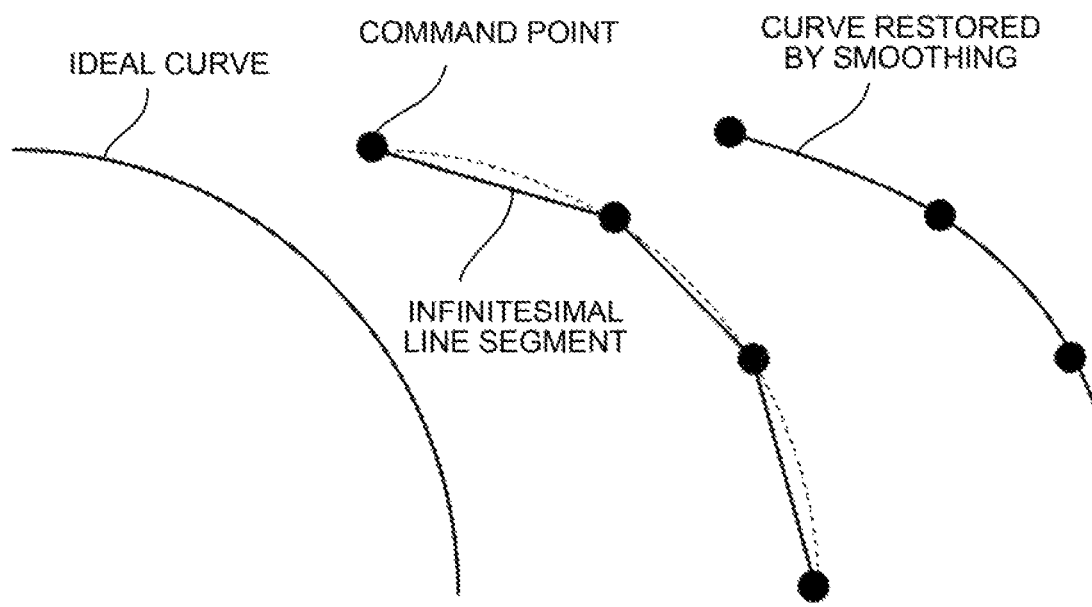
FIG. 1 illustrates a conventional tool path creating process.
Figure 2:
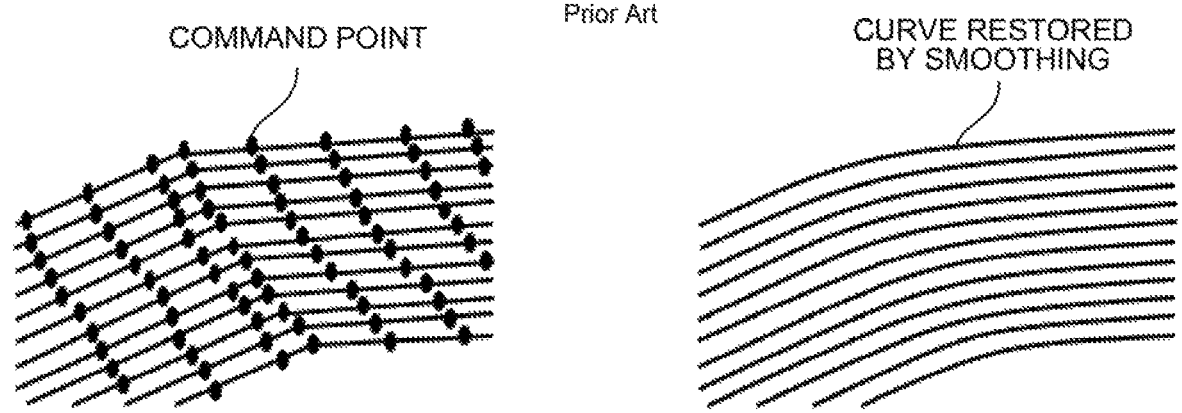
FIG. 2 illustrates problems in the conventional tool path creating process.
Figure 3:
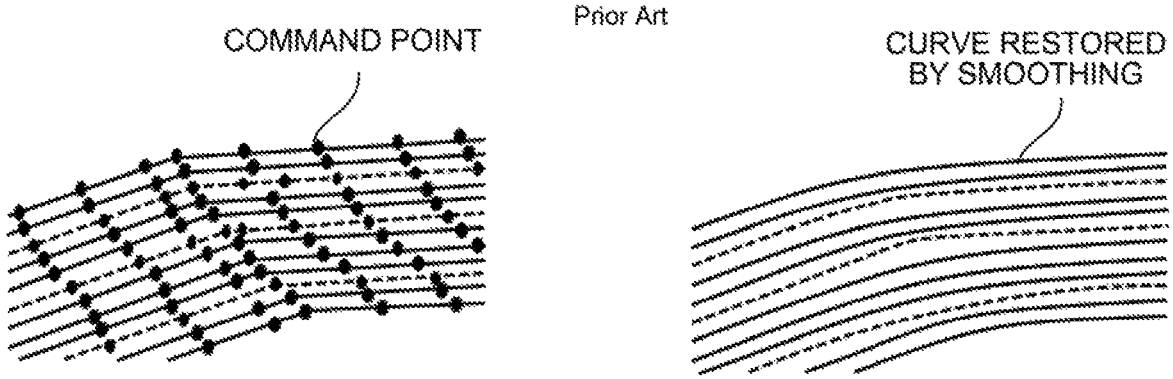
FIG. 3 illustrates problems in the conventional tool path creating process.
Figure 4:
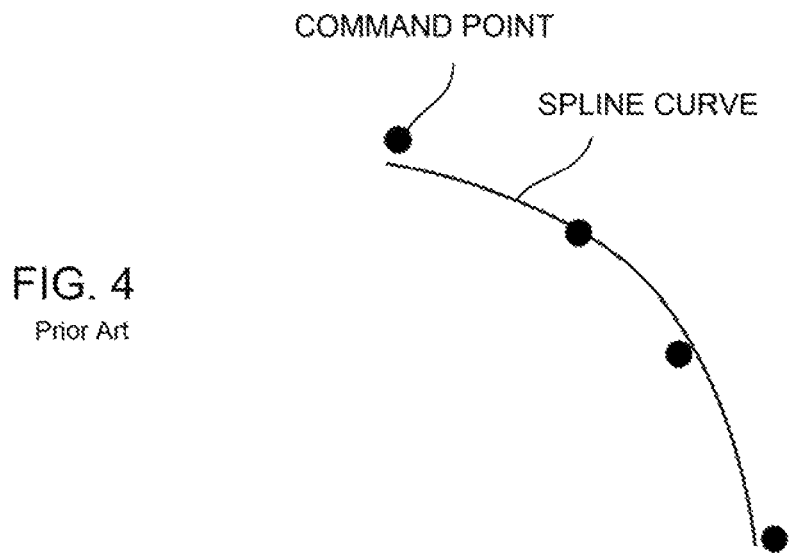
FIG. 4 illustrates problems in the conventional tool path creating process.
Figure 5:
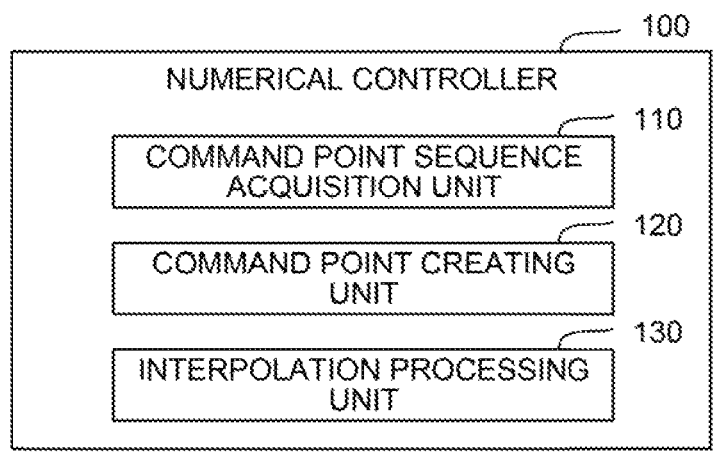
FIG. 5 is a block diagram illustrating a configuration of a numerical controller.

FIG. 5 is a block diagram showing a functional configuration of a numerical controller 100 according to an embodiment of the present invention.

The numerical controller 100 includes: a command point sequence acquisition unit 110 that receives a command point sequence generated by CAM; a command point creating unit 120 that creates additional command points for accurate interpolation on the basis of the command point sequence acquired by the command point sequence acquisition unit 110; and an interpolation processing unit 130 that interpolates the command points acquired by the command point sequence acquisition unit 110 and the command points created by the command point creating unit 120 to create a tool path.

A typical numerical controller 100 includes a central processing unit (CPU), a storage device, and input and output devices. The CPU's execution of a program stored in the storage device logically achieves the command point sequence acquisition unit 110, the command point creating unit 120, and the interpolation processing unit 130.

The command point sequence acquisition unit 110 and the interpolation processing unit 130 thereamong can be achieved using a publicly known technique. A publicly known interpolation processing unit receives the command point sequence generated by CAM, interpolates command points with spline curves or the like, and outputs the tool path. The command points may be interpolated not only with spline curves but also lines (i.e., infinitesimal line segments), arcs, and other curves (high order functions, Bezier curves, etc.). The interpolation processing unit 130 according to this embodiment is different, from the publicly known technique, in that the interpolation process is performed based on the command points generated by the command point creating unit 120 in addition to the command point sequence generated by CAM. However, the method of the interpolation process itself is the same as the conventional method.

Figure 6:
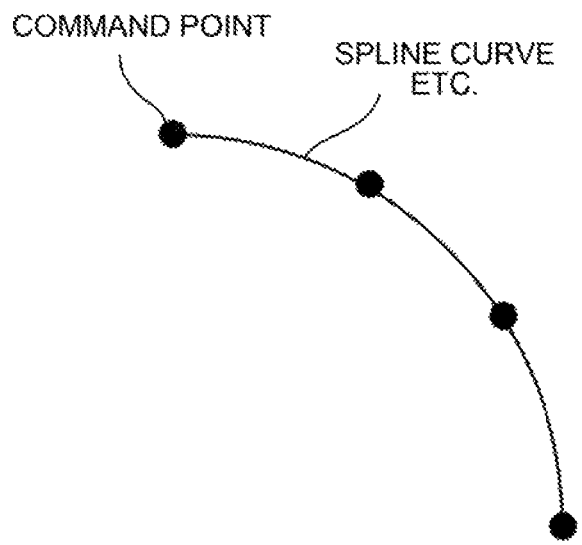
FIG. 6 illustrates an example of an interpolation process by an interpolation processing unit.

The spline curve generated by the publicly known interpolation processing unit does not necessarily pass the point sequence (i.e., does not include the point sequence) in some cases. However, it is preferable that the interpolation processing unit 130 according to this embodiment uses a spline curve, an infinitesimal line segment, an arc, or another curve that includes the point sequence (FIG. 6). The command point creating unit 120 accurately creates additional command points. Accordingly, the interpolation process that allows such command points to be included can more accurately restore the ideal curve.

The command point creating unit 120 is a processing unit that is characteristic in this embodiment. The command point creating unit 120 creates an additional command point PX between existing two command points, P1 and P2, that are adjacent to each other (typically, on the perpendicular bisector). The distance from the line connecting the command points P1 and P2 to the additional command point PX is called an amount of deviation D.

Referring to FIGS. 7 to 10, an example of a method of obtaining the additional command point PX having a desired amount of deviation D is described. Preferably, the additional command point PX has a distance to the ideal curve as small as possible. The ideal curve is often created on CAD using a high order function or a Bezier curve. However, if several consecutive command points are focused, the error between the arc passing through these command points and the ideal curve is small. Consequently, in this embodiment, the additional command point is provided on the arc passing through the several command points.

Figure 7:
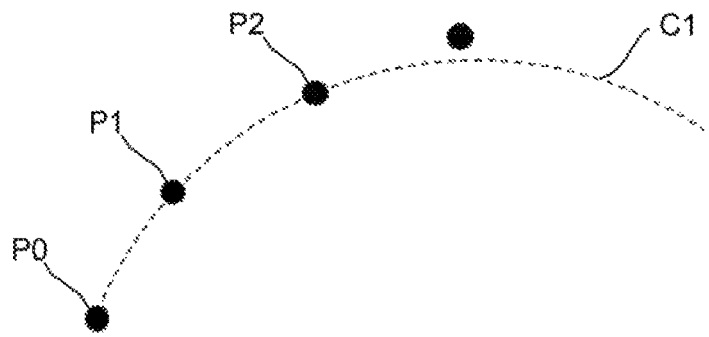
FIG. 7 illustrates an example of a command point creation process by a command point creating unit.
Figure 8:
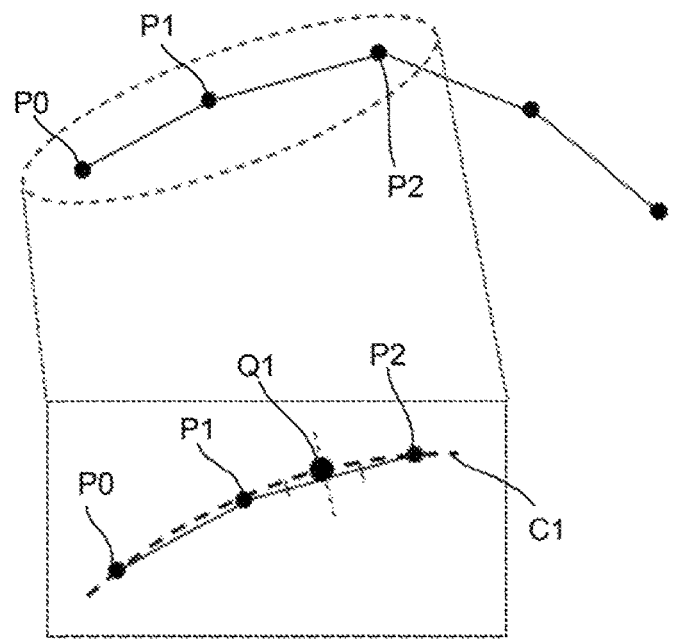
FIG. 8 illustrates an example of the command point creation process by the command point creating unit.

As shown in FIGS. 7 and 8, first, the command point creating unit 120 obtains an arc C1 that passes through three existing command points P0, P1 and P2. Here, the command point P0 is a command point adjacent to the command point P1, and is arranged on the opposite side of the command point P2 across the command point P1. The arc C1 is represented by the following equation (1).

$$x^2+y^2+lx+my+n=0 \tag{1}$$

The command point creating unit 120 substitutes the coordinates (x0, y0), (x1, y1) and (x2, y2) of three existing command points P0, P1 and P2 into the equation (1), and solves simultaneous equations, thereby allowing the coefficients l, m and n to be obtained.

In a case where the curvature of the ideal curve is constant, the additional command point PX can be provided on the arc C1 obtained by this method. In this case, the command point creating unit 120 can calculates, as PX, the intersection point Q1 between the arc C1 and the perpendicular bisector of the command points P1 and P2.

Figure 9:
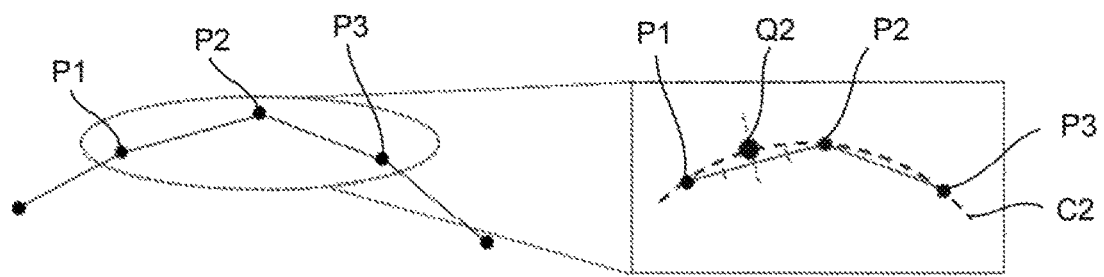
FIG. 9 illustrates an example of the command point creation process by the command point creating unit.
Figure 10:
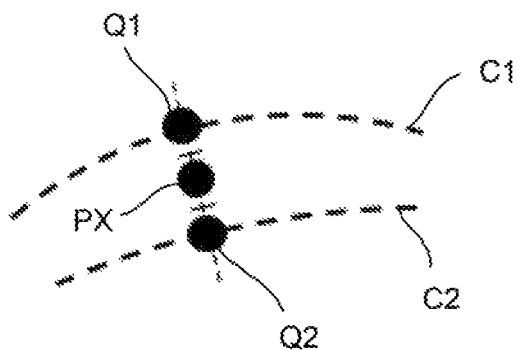
FIG. 10 illustrates an example of the command point creation process by the command point creating unit.

On the contrary, in a case where the curvature of the ideal curve varies, the additional command point PX can be calculated in consideration of the variation in curvature. Referring to FIGS. 9 and 10, an example of a method of calculating the additional command point PX in consideration of the variation in curvature is described.

As shown in FIG. 9, the command point creating unit 120 obtains an arc C2 that passes through three existing command points P1, P2 and P3. Here, the command point P3 is a command point adjacent to the command point P2, and is arranged on the opposite side of the command point P1 across the command point P2. Likewise, the command point creating unit 120 obtains the coefficients of the equation that represents the arc C2.

Next, as shown in FIG. 10, the command point creating unit 120 calculates the intersection point Q1 between the arc C1 and the perpendicular bisector between the command points P1 and P2, and the intersection point Q2 between the arc C2 and the perpendicular bisector between the command points P1 and P2. The command point creating unit 120 then calculates an intermediate point (typically, the midpoint) between Q1 and Q2, as the additional command point PX.

According to this embodiment, the command point creating unit 120 inserts the additional command point PX between the two command points P1 and P2. The additional command point PX can be set on the arc C1, which passes through the command points P0, P1 and P2. More preferably, the additional command point PX can be set between the arc C1 and the arc C2, which passes through the command points P1, P2 and P3. The interpolation processing unit 130 performs the interpolation process using not only the existing command points P1 and P2 but also the additional command point PX. As described above, the numerical controller 100 accurately interpolates the command points without reference to the adjacent paths. Consequently, the quality of the machining surface of a workpiece can be improved.

That is, the command point creating unit 120 accurately increases the number of command points, thereby allowing the interpolation processing unit 130 to restore the command shape that is close to the ideal curve originally created by CAD. Consequently, the disorder of steps between adjacent paths after the smoothing process can be alleviated.

Example

Figure 11:
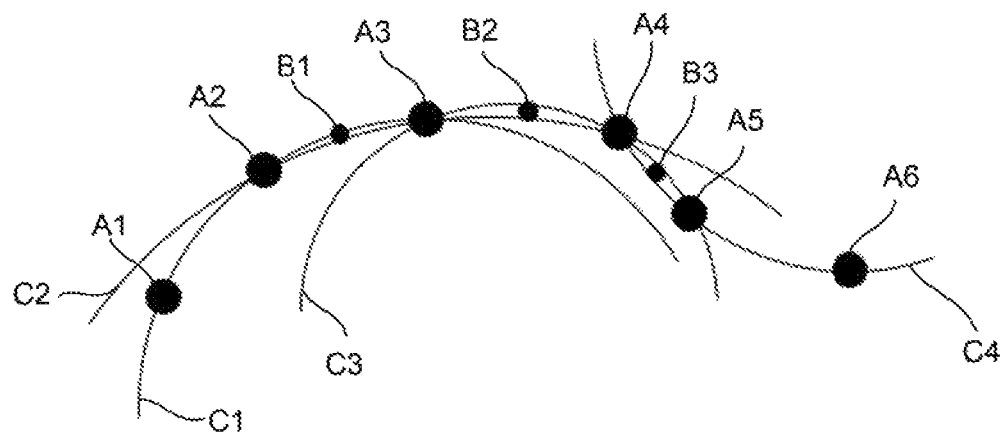
FIG. 11 illustrates an example of the command point creation process in one Example of the present invention.

An Example of this embodiment is described with reference to FIGS. 11 and 12.

(1) Acquisition of Command Point Sequence

The command point sequence acquisition unit 110 acquires the coordinates of the points A1, A2, A3, A4, A5 and A6 that form a command point sequence output from CAM. In FIG. 11, these existing command points are indicated by a large circle.

(2) Creation of Additional Command Points

The command point creating unit 120 newly creates additional command points B1, B2 and B3 between the existing command points acquired by the command point sequence acquisition unit 110. In FIG. 11, these additional command points are indicated by a small circle.

(Creation of an Additional Command Point B1)

The command point creating unit 120 can create the additional command point B1 according to the processes in the following steps 1 to 5.

Step 1: The command point creating unit 120 defines the arc C1 passing through three points, i.e., A1 that is an end point in the command point sequence, A2 that is adjacent to A1, and A3 that is adjacent to A2. As described in the aforementioned embodiment, C1 can be calculated from the equation (1) and the coordinates of the command points A1, A2 and A3.

Step 2: The command point creating unit 120 calculates the coordinates of a point b11 that is on the arc C1 and is on the perpendicular bisector of a line segment A2-A3 whose end points are the command points A2 and A3.

Step 3: The command point creating unit 120 defines the arc C2 passing through three points, i.e., A2 and A3, in the command point sequence focused in step 1 (excluding A1 of an end point), and A4 that is adjacent to A3.

Step 4: The command point creating unit 120 calculates the coordinates of a point b12 that is on the arc C2 and is on the perpendicular bisector of the line segment A2-A3 whose end points are the command points A2 and A3, the command points A2 and A3 being the same as those focused in step 2.

Step 5: The command point creating unit 120 calculates the coordinates of the midpoint B1 between b11 and b12, and outputs the coordinates as those of the additional command point.

(Creation of Additional Command Points B2 and B3)

The command point creating unit 120 repeats the processes in steps 2 to 5 described above while shifting the command point sequence to be focused, thereby creating additional command points B2 and B3.

Step 6: The command point creating unit 120 calculates the coordinates of a point b21 that is on the arc C2 and is on the perpendicular bisector of the command points A3 and A4.

Step 7: The command point creating unit 120 defines an arc C3 passing through consecutive three points A3, A4 and A5 in the command point sequence.

Step 8: The command point creating unit 120 calculates the coordinates of a point b22 that is on the arc C3 and is on the perpendicular bisector of the command points A3 and A4, the command points A3 and A4 being the same as those focused in step 6.

Step 9: The command point creating unit 120 calculates the coordinates of the midpoint B2 between b21 and b22, and outputs the coordinates as those of the additional command point.

Step 10: The command point creating unit 120 calculates the coordinates of a point b31 that is on the arc C3 and is on the perpendicular bisector of the command points A4 and A5.

Step 11: The command point creating unit 120 defines an arc C4 passing through consecutive three points A4, A5 and A6 in the command point sequence.

Step 12: The command point creating unit 120 calculates the coordinates of a point b32 that is on the arc C4 and is on the perpendicular bisector of the command points A4 and A5, the command points A4 and A5 being the same as those focused in step 10.

Step 13: The command point creating unit 120 calculates the coordinates of the midpoint B3 between b31 and b32, and outputs the coordinates as those of the additional command point.

(3) Interpolation Process

Figure 12:
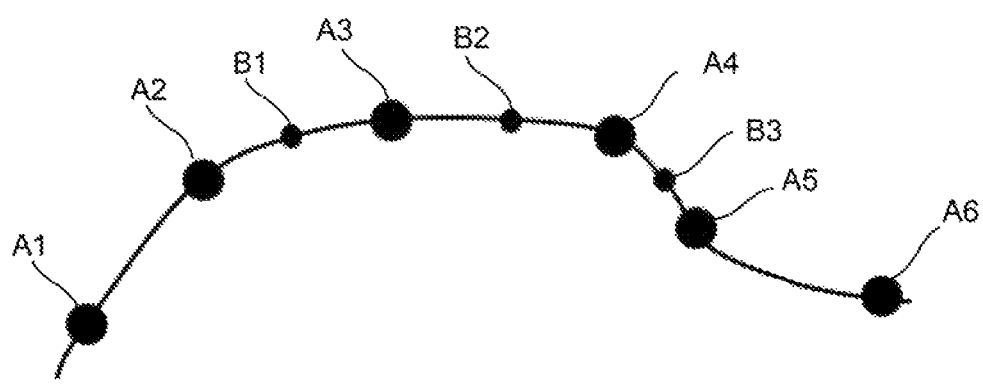
FIG. 12 illustrates an example of an interpolation process in the one Example of the present invention.

The interpolation processing unit 130 calculates a spline curve consecutively passing through a point sequence made up of the existing command points and additional command points A1, A2, B1, A3, B2, A4, B3, A5 and A6 (or its vicinity), and outputs the curve as the tool path (FIG. 12).

The embodiment of the present invention has thus been described. However, the present invention is not limited only to any one of the embodiments or the examples described above, but may be appropriately changed to thereby be executed in various modes.

For example, in the embodiment described above, additional command points cannot be created between A1 and A2, and A5 and A6, which are the opposite ends of the existing command point sequences. However, for example, the point that is on the arc C1 and is on the perpendicular bisector between the command points A1 and A2, and the point that is on the arc C4 and is on the perpendicular bisector of the command points A5 and A6 may be output as additional command points.

The command point creating unit 120 may create an additional command point at a position between command points in the existing command point sequence only when the distance between the above command points is larger than a predetermined value. That is because disorder of steps between adjacent paths after the smoothing process is likely to occur in a case where the distance between the command points is relatively long. As described above, according to the present invention, the command points can be added only to the narrowed-down positions having highly advantageous effects. Consequently, the interpolation can be accurately performed, with the processing load being reduced.

The embodiment of the present invention has thus been described. However, the present invention is not limited only to the examples of the embodiment described above, but may be appropriately changed to thereby be executed in other modes.

The invention claimed is:

1. A numerical controller creating a tool path from a plurality of command points, the numerical controller comprising: a processor configured to:
　acquire an existing command point sequence;
　newly create at least one additional command point, based on the existing command point sequence;
　interpolate the existing command point sequence and the additional command point to create the tool path, wherein the additional command point is output as an intersection point Q1 between an arc C1 passing through consecutive three command points, P0, P1 and P2, in the existing command point sequence and a perpendicular bisector of a line segment whose end points are P1 and P2;
　and
　perform a machining operation based on the created tool path.

2. The numerical controller according to claim 1, wherein the at least one additional command point is a midpoint between the intersection point Q1 and an intersection point Q2, the intersection point Q2 being between an arc C2 passing through P1, P2 and P3 that is adjacent to P2 in the existing command point sequence and the perpendicular bisector of the line segment whose end points are P1 and P2.

3. The numerical controller according to claim 1, wherein the additional command point is created at a position between command points in the existing command point sequence when the distance between said command points is larger than a predetermined value.

* * * * *